United States Patent
Lee

(10) Patent No.: US 10,885,179 B2
(45) Date of Patent: Jan. 5, 2021

(54) JUST-IN-TIME USER PROVISIONING FRAMEWORK IN A MULTITENANT ENVIRONMENT

(75) Inventor: Jong Lee, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 595 days.

(21) Appl. No.: 13/486,372

(22) Filed: Jun. 1, 2012

(65) Prior Publication Data

US 2013/0091171 A1    Apr. 11, 2013

Related U.S. Application Data

(60) Provisional application No. 61/543,371, filed on Oct. 5, 2011.

(51) Int. Cl.
| | |
|---|---|
| *G06F 16/00* | (2019.01) |
| *G06F 21/41* | (2013.01) |
| *H04L 29/06* | (2006.01) |
| *G06F 21/62* | (2013.01) |
| *G06F 16/20* | (2019.01) |

(52) U.S. Cl.
CPC .............. *G06F 21/41* (2013.01); *G06F 16/20* (2019.01); *G06F 21/6227* (2013.01); *H04L 63/0815* (2013.01); *G06F 2221/2141* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,144,959 A * | 11/2000 | Anderson ............... G06F 21/31 707/999.009 |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Khanh B Pham
(74) *Attorney, Agent, or Firm* — Sterne, Kessler, Goldstein & Fox P.L.L.C.

(57) ABSTRACT

A method of provisioning organization users in a multi-tenant database system includes receiving a request via a single sign-on protocol from an organization user to create a new multi-tenant database user account for access to the multi-tenant database system. The method retrieves rules that specify how to derive user permissions for access to the multi-tenant database system from stored user attributes of the organization user. The method continues with applying the rules to the stored user attributes to determine permissions for the users to access particular objects in the multi-tenant database system, and creating the new user account with the determined user permissions for access to the multi-tenant database system.

21 Claims, 5 Drawing Sheets

(56) References Cited

U.S. PATENT DOCUMENTS

| | | | |
|---|---|---|---|
| 6,182,142 B1 * | 1/2001 | Win | G06F 21/604 709/219 |
| 6,189,011 B1 | 2/2001 | Lim et al. | |
| 6,202,066 B1 * | 3/2001 | Barkley et al. | 707/785 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,603,483 B2 | 10/2009 | Psounis et al. | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,756,275 B2 | 6/2014 | Jakobson | |
| 8,769,004 B2 | 7/2014 | Jakobson | |
| 8,769,017 B2 | 7/2014 | Jakobson | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0149781 A1 * | 8/2003 | Yared et al. | 709/229 |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0148517 A1 * | 7/2004 | Banks-Binici et al. | 713/201 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0187956 A1 * | 8/2005 | Sylvester et al. | 707/101 |
| 2006/0021019 A1 | 1/2006 | Hinton et al. | |
| 2007/0150480 A1 * | 6/2007 | Hwang et al. | 707/10 |
| 2008/0249972 A1 | 10/2008 | Dillon | |
| 2009/0063415 A1 | 3/2009 | Chatfield et al. | |
| 2009/0089625 A1 * | 4/2009 | Kannappan et al. | 714/39 |
| 2009/0100342 A1 | 4/2009 | Jakobson | |
| 2009/0177744 A1 | 7/2009 | Marlow et al. | |
| 2010/0076946 A1 * | 3/2010 | Barker et al. | 707/705 |
| 2011/0218958 A1 | 9/2011 | Warshavsky et al. | |
| 2011/0247051 A1 | 10/2011 | Bulumulla et al. | |
| 2012/0011578 A1 * | 1/2012 | Hinton | H04L 9/3228 726/8 |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0247216 A1 | 9/2013 | Cinarkaya et al. | |

* cited by examiner

JUST-IN-TIME USER PROVISIONING FRAMEWORK IN A MULTITENANT ENVIRONMENT

RELATED APPLICATION

This application claims the benefit of U.S. Provisional Patent Application No. 61/543,371, entitled "Just-In-Time User Provisioning Framework in a Multitenant Environment," filed on 5 Oct. 2011. The provisional application is hereby incorporated by reference for all purposes.

BACKGROUND

The present technology relates to provisioning organization users in a multi-tenant database system. In particular, it relates to efficiently provisioning a large number of users in an organization in a multi-tenant database system where user accounts of many of the users, if created, are likely to be inactive.

Traditionally, user accounts for a large number of users in an organization are created in advance in a multi-tenant database system, before users can have access to the multi-tenant database system. However, once the user accounts are created, many of the users may not login to the multi-tenant database system. Thus it is a waste of resources to provision the large number of users in an organization in advance in the multi-tenant database system. An alternative method is to provision a user upon the initial request of the user to access the multi-tenant database system. However, this method may require each individual user to manually provide information about the organization and the user to a system administrator or an equivalent authority for approval, and consequently may be complicated and cause delay before the user can access the multi-tenant database system for the first time.

An opportunity arises to provide a provisioning method where it is not required to provision users in advance, and yet it is simple to provision each user the first time the user tries to login.

SUMMARY

One example of a method of provisioning organization users in a multi-tenant database system includes receiving a request via a single sign-on protocol from an organization user to create a new multi-tenant database user account for access to the multi-tenant database system. The method retrieves rules that specify how to derive user permissions for access to the multi-tenant database system from stored user attributes of the organization user. The method continues with applying the rules to the stored user attributes to determine permissions for the users to access particular objects in the multi-tenant database system, and creating the new user account with the determined user permissions for access to the multi-tenant database system. Particular aspects of the technology disclosed are described in the claims, specification and drawings.

DETAILED DESCRIPTION

The following detailed description is made with reference to the figures. Examples are described to illustrate the present technology, not to limit its scope, which is defined by the claims. Those of ordinary skill in the art will recognize a variety of equivalent variations on the description that follows.

Technology is described herein for just-in-time provisioning of organization users of an organization for access to a multi-tenant database system (MTDS). The technology described processes a request from an organization user via a single sign-on protocol to create a new user account on the fly. The new user account is provisioned the first time the organization user tries to login to the MTDS. This technology provides an alternative to creating user accounts in advance. For example, if an organization has added a new employee, there is no need to manually create a new user account in the MTDS in order for the new employee to access the system. When the new user tries to login to the multi-tenant database system for the first time using a single sign-on protocol, a new user account is automatically provisioned for the new user.

A single sign-on protocol is a standard for exchanging authentication and authorization data between an identity provider and a service provider. For example, the multi-tenant database system may be a service provider. The organization user is enrolled with at least one identity provider. The identity provider forwards attributes of the organization user via the single sign-on protocol to the service provider. The organization user uses the single sign-on protocol to initiate sessions with the multi-tenant database system for security and simplicity.

Figure 1:
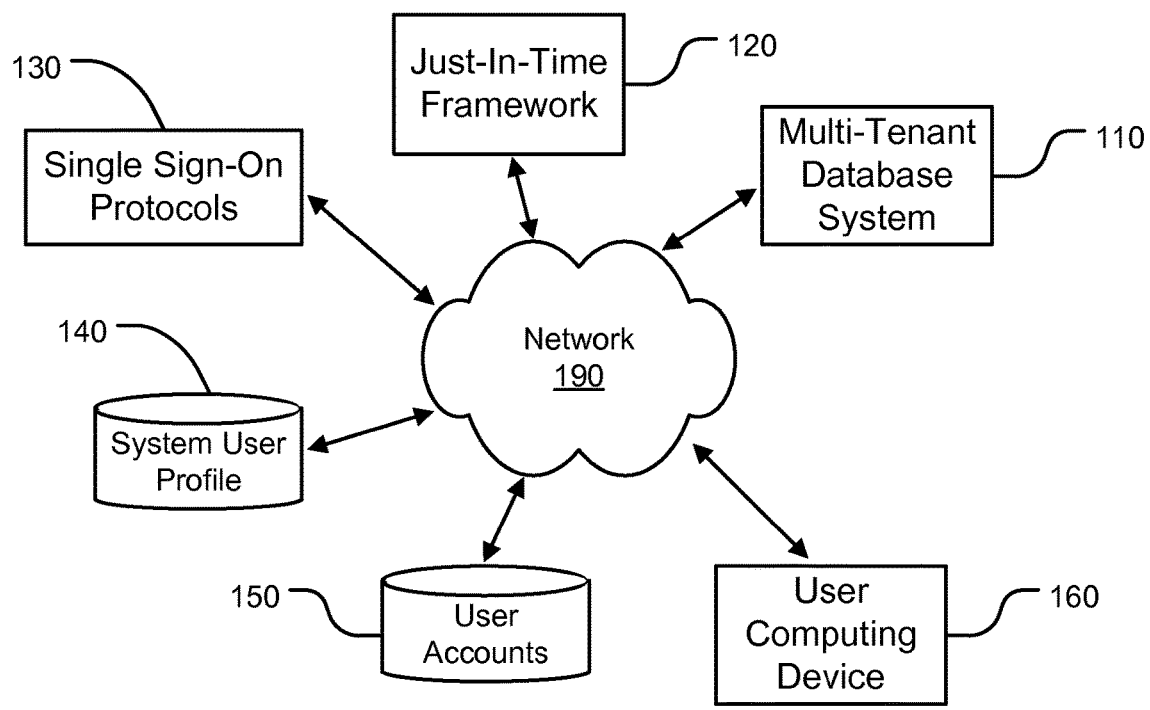
FIG. 1 illustrates a block diagram of an example environment in which a just-in-time user provisioning framework can be used.

FIG. 1 is a block diagram of an example environment in which a just-in-time user provisioning framework can be used, according to one implementation. The environment 100 includes a multi-tenant database system 110, a just-in-time user provisioning framework (hereinafter "just-in-time framework") 120, single sign-on protocols 130, a system user profile 140, user accounts 150, and a user computing device 160. The environment 100 may include multiple user computing devices 160. The environment 100 also includes a communication network 190 that provides communication between various components of the environment.

During operation, the just-in-time framework 120 receives a request via a single sign-on protocol 130 from an organization user to create a new multi-tenant database user account for access to the multi-tenant database system 110. The request passes attributes of the organization user, which are then stored in the multi-tenant database system 110. The request may be initiated at a user computing device 160 such as a smartphone, a tablet, a laptop or a desktop computer. Examples of single sign-on protocols 130 include SAML (Security Assertion Markup Language), OAuth (Open standard for Authorization), OpenID, EmpowerID Federation Services, Oracle Access Manager, and Tivoli Identity Manager. The single sign-on protocol 130 may also include proprietary security protocols of the organization.

The just-in-time framework 120 retrieves rules that can be stored with a system user profile 140, which specify how to derive user permissions for access to the multi-tenant database system 110 from stored user attributes. The just-in-time framework 120 then applies the rules to the user attributes to determine permissions for the user to access particular objects in the multi-tenant database system 110. Finally, the just-in-time framework 120 creates the new multi-tenant database user account 150 with the determined user permissions for access to the multi-tenant database system 110.

Figure 2:
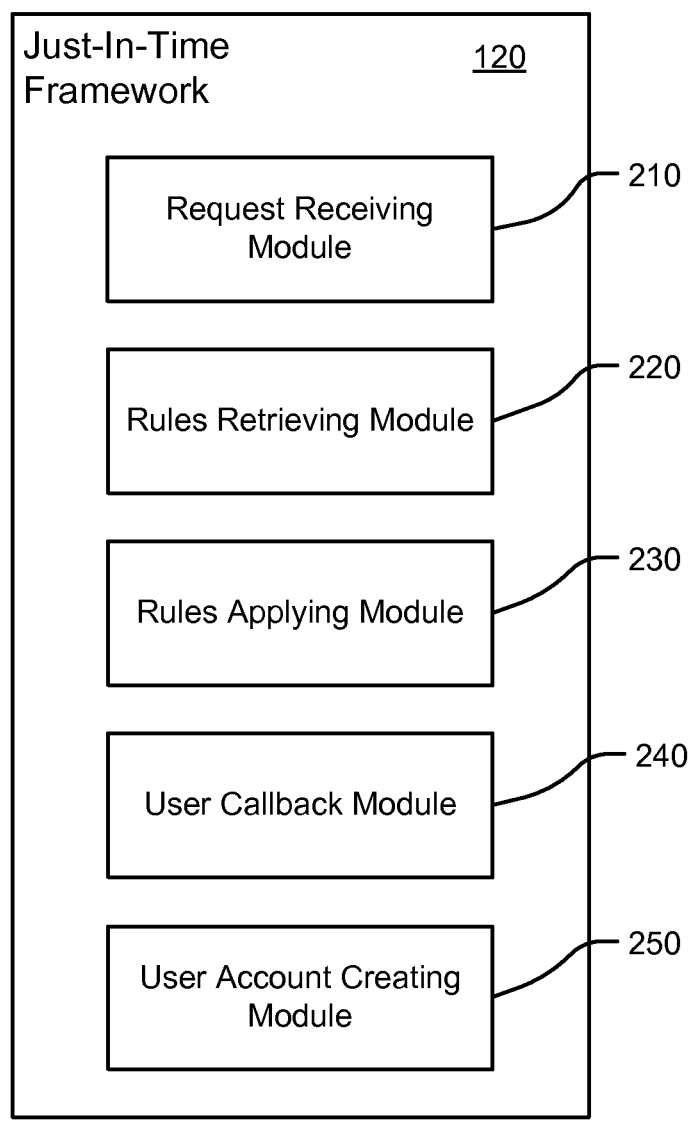
FIG. 2 illustrates a block diagram of example modules within the just-in-time user provisioning framework.

FIG. 2 illustrates a block diagram of example modules within the just-in-time user provisioning framework 120. The just-in-time user provisioning framework 120 includes a request receiving module 210, a rules retrieving module 220, a rules applying module 230, a user callback module 240, and a user account creating module 250. Some implementations may have different and/or additional modules than those shown in FIG. 2. Moreover, the functionalities can be distributed among the modules in a different manner than described herein.

The request receiving module 210 receives a request via a single sign-on protocol 130 from an organization user to create a new multi-tenant database user account for access to the multi-tenant database system 110, based on stored user attributes of the organization user. Examples of single sign-on protocols 130 include those listed above. Attributes of the organization user may be passed with the request or in a separate communication and stored in the multi-tenant database system 110.

Some example rules follow. The example rules may be related to accessing the multi-tenant database system, to configurations according to user characteristics, or to both.

(1) User activating rule
(2) User locale setting rule
(3) Forecast enabling rule The single sign-on attributes to which these rules apply are keyed include is Active, LocaleSidKey, and ForecastEnabled. Examples of attributes that trigger these rules and results of applying the rules are depicted below.

| Attribute | Rule | Result |
|---|---|---|
| isActive | (1) | If the value of the attribute is set to true, the user will be activated and be ready to use the system, otherwise the user will be inactive. |
| LocaleSidKey | (2) | If the value is specified for the attribute, the user locale is set to the value, otherwise a default is derived from the organization settings. |
| ForecastEnabled | (3) | If the value of the attribute is set to true, the forecasting capability is turned on for the user, otherwise the forecasting capability is turned off for the user. |

If the user is inactive, the user account may be determined to have no permissions on any objects. If the user is active, the user account may be determined to have permissions in accordance with other attributes for the user.

The LocaleSidKey attribute affects the format of date, date/time, number fields, and the calendar. For instance, dates in the English (United States) locale display as 06/30/2000 and as 30/06/2000 in the English (United Kingdom) locale. The LocaleSidKey also affects the first name and last name order on "name" fields for users, leads, and contacts. For instance, Bob Johnson in the English (United States) locale displays as Bob Johnson, whereas the Chinese (China) locale displays the name as Johnson Bob. A default locale may be the English (United States) locale. For users from countries other than the United States, the default locale may not be appropriate, and the value for the LocaleSidKey needs to be set. Mismatched or misinterpreted locales may result in user accounts not being created or incorrect permissions being applied to the user accounts.

A forecast is an estimated amount of how much revenue a customer account or a group of customer accounts can generate in a time period such as a quarter. The estimated amount may have a range between the revenue that can most likely generated and the revenue that can possibly generated. The ForecastEnabled attributes determines whether the forecast capability is provided for a particular user, and accordingly, how to set permissions on objects related to revenue forecasting. For instance, a forecast web page includes functions for a user to create and locate forecasts. If the ForecastEnabled attribute is set to true for a user, then the user account of the user may be determined to have create, read, and write permissions on the forecast web page. Otherwise, the user account is not determined to have create, read, and write permissions on the forecast web page.

In addition to automatic, rule-based provisioning of object permissions, a database administrator could assign a new user to a group with an effect similar to automatic rules.

The rules retrieving module 220 retrieves rules that specify how to derive user permissions for access to the multi-tenant database system 110 based on the stored user attributes. The rules may be stored with a system user profile 140. The user attributes for regular single sign-on just-in-time users may include user name, email, last name, profile identifier, first name, last name, employee number, title, department, division, manager, company name, street, city, state, zip code, country, office phone, extension, mobile phone, fax, etc. Additional user attributes for portal users may include portal identifier, organization identifier, federation identifier, account identifier, contact identifier, portal role, billing address, annual revenue, number of employees, ownership, ticker symbol, website, etc. The rules may specify how to derive user permissions for particular objects in the multi-tenant database system based on the user attributes such as described herein.

The rules applying module 230 applies the rules to the stored user attributes to determine permissions for the user to access particular objects in the multi-tenant database system 110. Permissions may include create, read, update and delete permissions for particular objects in the multi-tenant database system 110. For instance, permissions may be based on the title and department of the organization user in the organization. As an example, the rules may specify that an accounting manager may have create, read, update and delete permissions on particular objects associated with financial records of particular customers, while a marketing manager may only have read permission on such objects.

The user callback module 240 may request user attributes that are required for provisioning the organization user for access to the multi-tenant database system, but not included in the request via the single sign-on protocol. The organization user may provide the required but not yet provided attributes using the SOAP (Simple Object Access Protocol) or REST (Representational state transfer) protocol. For instance, for an organization user to create a new multi-tenant database user account, required attributes may include user name, email, last name, and profile identifier. If the required email attribute is not included in the request, the user callback module 240 may request the organization user for the email attribute.

Once required attributes for provisioning the organization user for access to the multi-tenant database system are received, the user account creating module 250 verifies the request against existing user accounts in the multi-tenant database system. If the user account does not already exist, the user account creating module 250 creates the new multi-tenant database user account 150 for the organization user with the determined user permissions for access to the multi-tenant database system 110. If the user account already exists, the user account creating module 250 may update attributes of the user account based on attributes passed with the request and stored in the multi-tenant database system. For instance, an organization user may have changed his or her department attribute from a technical support department to an accounting department within the organization, and his or her permissions need to be updated accordingly.

Figure 3:
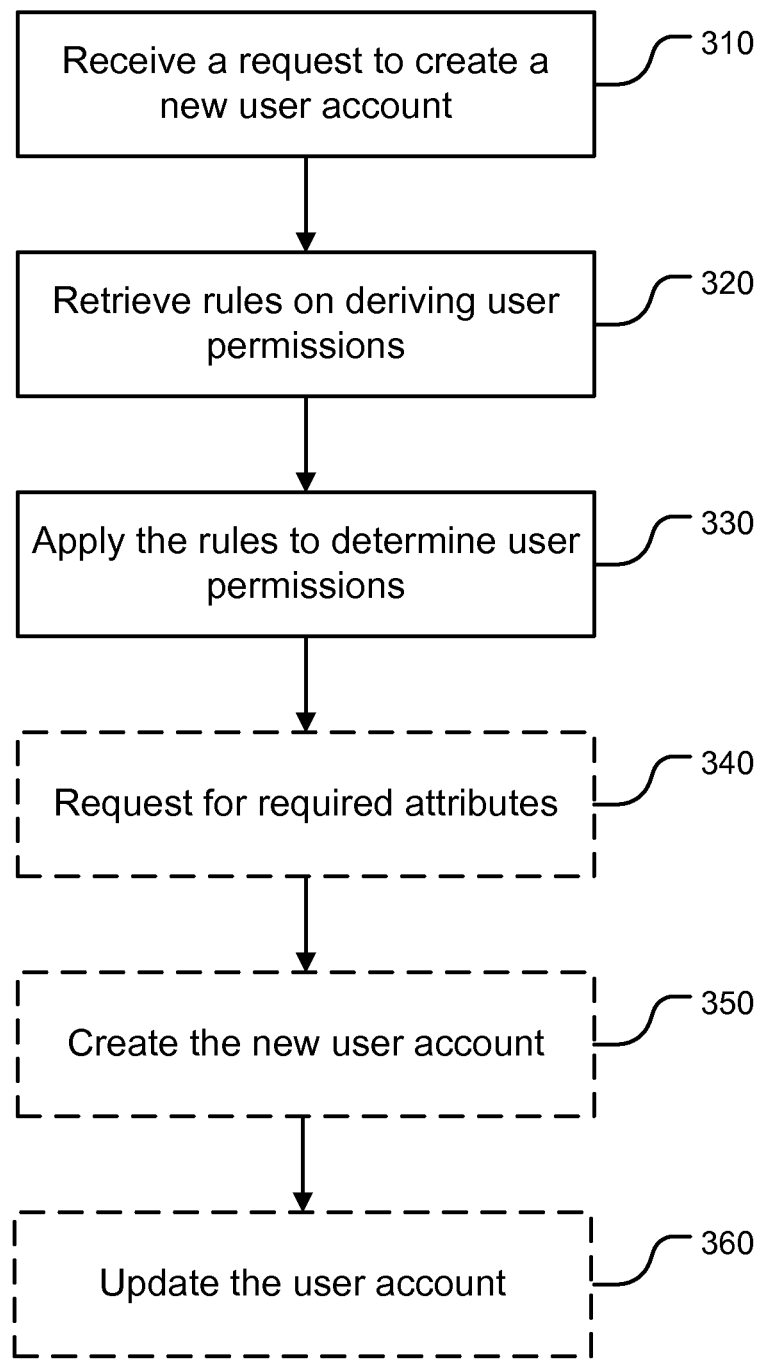
FIG. 3 illustrates a high-level flow chart for a method of provisioning organization users in a multi-tenant database system.

FIG. 3 illustrates a high-level flow chart for a method of provisioning organization users in a multi-tenant database system. Actions 310-360 can be combined in a variety of ways and expressed in a variety of methods. For instance, the method may retrieve a minimal set of rules initially, and depending on results from applying the minimal set of rules to the user attributes, retrieve more rules as needed.

With action 310, the method receives a request via a single sign-on protocol from an organization user to create a new multi-tenant database user account for access to the multi-tenant database system. The single sign-on protocol 130 may include any of the protocols identified above. The attributes of the organization user may be passed with the request and stored in the multi-tenant database system 110.

With action 320, the method retrieves rules that specify how to derive user permissions for access to the multi-tenant database system from stored user attributes of the organization user. The rules may be stored with the system user profile 140. The user attributes are described in connection with the rules retrieving module 220.

The method may have rules to match a minimal set of required user attributes for creating a user account, such as user name, email, last name, and profile identifier. The profile identifier attribute may classify users as system administrator, standard user, etc. Other attributes, such as title, department, division, manager, may classify organization users as accounting manager, sales manager, salesperson, marketing manager, technical support expert, etc. Accordingly, the rules may specify how to derive user permissions for particular objects in the multi-tenant database system based on the user attributes.

With action 330, the method applies the rules to the stored user attributes of the organization user to determine permissions for the new MTDB user account to access particular objects in the multi-tenant database system. Permissions may include create, read, update and delete permissions for particular objects in the multi-tenant database system 110. For instance, permissions may be based on the title and department of the organization user in the organization. As an example, a technical support expert does not have create, read, update or delete permissions on objects associated with financial records of particular customers, but may have create, read, update or delete permissions on particular objects associated with contacting the particular customers. As another example, organization users may not have update or delete permission on objects associated with their own user name and federation identifier attributes.

With action 340, the method may request user attributes that are required but not included in the request. The user attributes that are required but not included in the request may be provided using the SOAP (Simple Object Access Protocol), REST (Representational state transfer) or another suitable protocol. For instance, if the profile identifier attribute is required for creating a user account but it is not provided, the method may request the profile identifier attribute before further processing.

Once the required attributes are received, the method verifies the request against existing user accounts in the multi-tenant database system. With action 350, if the user account does not already exist, the method creates the new user account with the determined user permissions for access to the multi-tenant database system 110.

With action 360, if the user account already exists, the method may update attributes of the user account based on attributes passed with the request and stored in the multi-tenant database system. For instance, an organization user's title attribute may change from an entry-level salesperson to a sales manager within the same organization, and the method may update his or her MTDB user permissions accordingly. Again, some attributes such as user name and federation identifier can only be created but not updated using the method described.

An organization user may be a regular user or a portal user. The description in connection with FIG. 3 of a high-level flow chart for a method of provisioning organization users in a multi-tenant database system generally applies to creating either a regular user or a portal user account. More attributes are involved in creating a portal user account. Additional description is provided below in connection with FIG. 4 for creating a portal user account.

Figure 4:
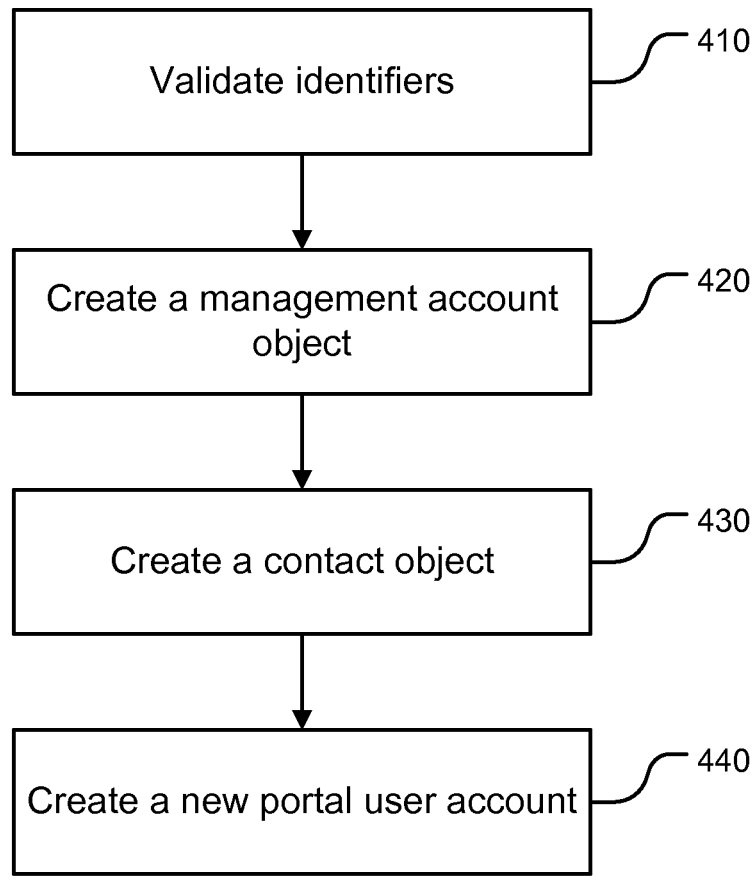
FIG. 4 illustrates a high-level flow chart for a method of creating a portal user account in a multi-tenant database system.

FIG. 4 illustrates a high-level flow chart for a method of creating a new portal user account in a multi-tenant database system. In one implementation, if a portal identifier attribute is included in the request via a single sign-on protocol from an organization user to create a new multi-tenant database user account, the request is treated as a request for a new portal user account, instead of a regular user account. Actions 410-440 combine to create a portal user account.

A portal user account is associated with a management account object. The management account object of a portal user account may be shared with other portal users. The management account object is used for content management of a portal user account. Content management may include organizing documents, searching documents, uploading documents, subscribing to documents, previewing documents, and reviewing documents. Content management may also include sharing content stored in the multi-tenant database system such as leads, accounts, contacts, opportunities, cases, products, and custom objects. For instance, the management account object is related to calculation of rules for sharing content with other portal users.

With action 410, the method first validates required identifier attributes for creating a new portal user account. For instance, the retrieved rules may specify that the required identifier attributes include portal identifier, organization identifier, federation identifier, account identifier, and contact identifier. If any of the identifier attributes is found to be missing, mismatched, or invalid, the just-in-time framework 120 issues an error code in a URL-parameter in response to the request from the organization user. If the required identifiers are valid, the method proceeds to action 420.

With action 420, the method creates a management account object at least based on the account identifier attribute. With action 430, the method creates a contact object based on at least the contact identifier attribute and the management account object. With action 440, when both the management account object and the contact object are created, the method creates the new portal user account based on at least the management account object and the contact object for the organization user.

The rules to apply when setting up an organization user as a new multi-tenant database user may specify a minimal set of required user attributes from the organization user for creating a user account, such as user name, email, last name, and profile identifier. The rules may specify how to derive the permissions from the profile identifier attribute which may classify users as system administrator, standard user, etc. The rules may specify how to derive the permissions from other attributes associated with the organization user, such as title, department, division, manager, etc.

For instance, the rules may specify that an accounting manager may have create, read, update and delete permissions on particular objects associated with financial records of an account, while a marketing manager may only have read permission on such objects. For instance, the rules may specify that a technical support expert does not have create, read, update or delete permissions on particular objects associated with financial records of customers, but may have create, read, update or delete permissions on particular objects associated with contacting the customers. For instance, the rules may specify that no organization user has the update or delete permission on particular objects associated with the user name and federation identifier attributes.

The rules may specify how to derive user permissions to access particular objects in the multi-tenant database system for a portal user account. For instance, a portal role attribute may be required for a portal user account. The portal role attribute may be associated with a portal role hierarchy. For instance, a role may include executive, manager, user, and person, with the executive at the top of the hierarchy and the person at the bottom of the hierarchy. The rules may specify that portal users of an account may have read permission to contacts in the same account. The rules may specify that portal users from different accounts do not have create, read, update or delete permissions on any records in each other's accounts, that a manager may have at least read permissions on records in accounts under his or her management, and that an executive may have at least read permission on any records in any accounts within the organization.

The present technology includes a method of initializing rules for provisioning organization users in a multi-tenant database system. The method includes receiving data specifying rules to apply when setting up an organization user as a new multi-tenant database user, wherein the rules specify how to derive permissions to access objects in the multi-tenant database from attributes of the organization user stored in an organization directory.

The attributes of the organization user stored in an organization directory may include attributes previously mentioned, such as user name, email, last name, profile identifier, first name, last name, title, department, division, manager, street, city, state, zip code, country, office phone, extension, mobile phone, fax, etc. The profile identifier attribute may classify users as system administrator, standard user, etc. Other attributes stored in the organization directory, such as title, department, division, manager, may classify users as accounting manager, sales manager, salesperson, marketing manager, technical support expert, etc. Additional user attributes for portal users may include portal identifier, organization identifier, federation identifier, account identifier, contact identifier, portal role, billing address, annual revenue, number of employees, ownership, ticker symbol, website, etc.

The method also includes storing the rules with a system user profile, wherein the profiled system user has limited rights to create new multi-tenant database users and to determine the new multi-tenant database user's permissions to access the particular objects based on applying the rules to the attributes of the organization user as stored in the organization directory. The attributes may include role attributes based on a role hierarchy. The rules may include particular rules that specify how to derive user permissions to access particular objects in the multi-tenant database system based on the role attributes. When a request is received to create a new multi-tenant database user account for access to the multi-tenant database, the rules may be retrieved. Subsequently, the retrieved rules may be applied to the organization user's attributes to determine permissions for the user to access particular objects in the multi-tenant database system.

The profiled system user has rights that normal multi-tenant database users do not have, such as rights to create new multi-tenant database users. The rights of the profiled system user are also limited. For instance, a system user is created for a particular organization so the limited rights of the system user for one organization do not apply to other organizations. As another example, the system user may have rights to read, but not rights to update or delete values of attributes of the organization user as stored in the organization directory.

Figure 5:
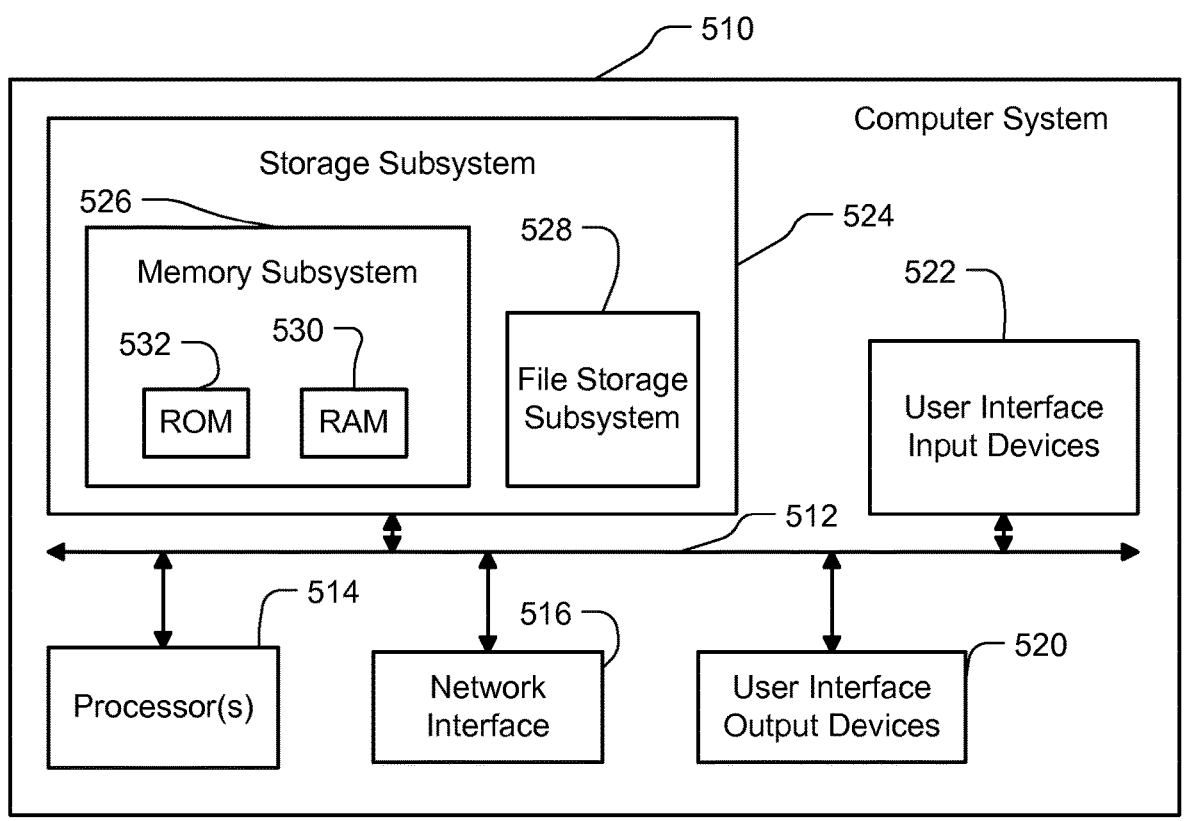
FIG. 5 is a block diagram of an example computer system.

FIG. 5 is a block diagram of an example computer system, according to one implementation. Computer system 510 typically includes at least one processor 514 which communicates with a number of peripheral devices via bus subsystem 512. These peripheral devices may include a storage subsystem 524 including, for example, memory devices and a file storage subsystem, user interface input devices 522, user interface output devices 520, and a network interface subsystem 516. The input and output devices allow user interaction with computer system 510. Network interface subsystem 516 provides an interface to outside networks, including an interface to communication network 190, and is coupled via communication network 190 to corresponding interface devices in other computer systems.

User interface input devices 522 may include a keyboard; pointing devices such as a mouse, trackball, touchpad, or graphics tablet; a scanner; a touchscreen incorporated into the display; audio input devices such as voice recognition systems and microphones; and other types of input devices. In general, use of the term "input device" is intended to include all possible types of devices and ways to input information into computer system 510 or onto communication network 190.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules and methods described herein. These software modules are generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a one example. Many other configurations of computer system 510 are possible having more or fewer components than the computer system depicted in FIG. 5.

Particular Implementations

One implementation of the technology disclosed is a method of provisioning organization users in a multi-tenant database system. The method includes receiving a request via a single sign-on protocol from an organization user to create a new multi-tenant database user account for access to the multi-tenant database system. The method includes retrieving rules that specify how to derive user permissions for access to the multi-tenant database system from stored user attributes of the organization user. The method includes applying the rules to the stored user attributes to determine permissions for the user to access particular objects in the multi-tenant database system. The method also includes creating the new user account with the determined user permissions for access to the multi-tenant database system. Additional implementations of the technology disclosed include corresponding systems, apparatus, and computer program products.

These and additional implementations can include one or more of the following features. In some implementations, the single sign-on protocol includes one or more of SAML (Security Assertion Markup Language), OAuth (Open standard for Authorization), OpenID, EmpowerID Federation Services, Oracle Access Manager, and Tivoli Identity Manager. A further implementation may include requesting user attributes that are required but not included in the request.

Another implementation creates the new user account by creating a management account object at least based on an account identifier attribute, by creating a contact object at least based on the contact identifier attribute and the management account object, and by creating a new portal user account at least based on the management account object and the contact object.

Another method initializes rules for provisioning organization users in a multi-tenant database system. The method includes receiving data specifying rules to apply when setting up an organization user as a new multi-tenant database user. The rules specify how to derive permissions to access particular objects in the multi-tenant database system from attributes of the organization user stored in an organization directory. The method also includes storing the rules with a system user profile. The profiled system user has limited rights to create new multi-tenant database users and to determine the new multi-tenant database user's permissions to access the particular objects based on applying the rules to the organization user's attributes as stored in the organization directory.

The attributes can include role attributes based on a role hierarchy of the organization. The rules can include particular rules that specify how to derive user permissions to access particular objects in the multi-tenant database system based on the role attributes.

As mentioned above, the technology disclosed may be implemented in a computer system for provisioning organization users in a multi-tenant database system. The computer system includes one or more processor configured to perform operations implementing methods as described herein and any of the features and optional implementations of the methods described.

As mentioned above, the technology disclosed may be implemented in non-transitory computer readable medium storing computer instructions to provision organization users of an organization in a multi-tenant database system. The non-transitory computer readable medium includes actions to implement methods as described herein and any of the features and optional implementations of the methods described.

While the present technology is disclosed by reference to the preferred implementations and examples detailed above, it is understood that these examples are intended in an illustrative rather than in a limiting sense. Computer-assisted processing is implicated in the described implementations. Accordingly, the present technology may be embodied in methods for provisioning organization users in a multi-tenant database system, systems including logic and resources to carry out provisioning organization users in a multi-tenant database system, systems that take advantage of computer-assisted provisioning organization users in a multi-tenant database system, media impressed with logic to carry out provisioning organization users in a multi-tenant database system, data streams impressed with logic to carry out provisioning organization users in a multi-tenant database system, or computer-accessible services that carry out computer-assisted provisioning organization users in a multi-tenant database system. It is contemplated that modifications and combinations will readily occur to those skilled in the art, which modifications and combinations will be within the spirit of the technology and the scope of the following claims.

I claim:

1. A computer-implemented method of provisioning organization users new to a remote service provider, including:

receiving a request from a user enrolled with an identity provider to access a system of the remote service provider via a single sign-on protocol, wherein the request requires creation of an organization user account for access to the system of the remote service provider;

receiving, as part of the request, stored user attributes including a role attribute associated with an existing account of the user from the identity provider via the single sign-on protocol;

receiving data specifying a plurality of rules to apply when setting up the user as a new user to access the system of the remote service provider;

storing the plurality of rules with a system user profile of a system user with account creation rights;

upon receipt of the request from the user, retrieving at least one rule of the plurality of rules from the system user profile;

deriving a permission, as specified by the at least one rule, for accessing an object within the system based on the stored user attributes, by:

matching the role attribute associated with the existing account to the at least one rule;

determining the permission for accessing the object within the system based on applying the at least one rule to the role attribute, and the matching; and creating, at the remote service provider, the organization user account with the permission for accessing the object based on the request.

2. The method of claim 1, wherein the single sign-on protocol includes SAML (Security Assertion Markup Language), OAuth (Open standard for Authorization), or OpenID.

3. The method of claim 1, wherein the role attribute is a first role attribute, and further including requesting, from a client device, a second role attribute not included in the request.

4. The method of claim 1, wherein the creating further includes:

creating a management account object at least based on an account identifier attribute;

creating a contact object at least based on a contact identifier attribute and the management account object; and creating a new portal user account at least based on the management account object and the contact object.

5. A computer-implemented method of initializing rules for provisioning organization users, enrolled with an identity provider, new to a remote service provider, including:

receiving a request via a single sign-on protocol to access a system of the remote service provider, wherein the request requires creation of an organization user account for access to the system;

receiving, at a provisioning framework device via a network, data specifying a plurality of rules to apply when setting up the user as a new user to access the system of the remote service provider, as well as stored user attributes associated with an existing account of the user from the identity provider;

storing the plurality of rules with a system user profile of a system user with account creation rights;

matching, by the provisioning framework device, at least one of the stored user attributes to at least one of the plurality of rules;

determining, at the provisioning framework device, an access right value associated with an object of the system based on applying the at least one of the plurality of rules to the at least one of the stored user attributes, and the matching; and creating, at the remote service provider, the organization user account with the access right value based on the request.

6. The method of claim 5, wherein the at least one of the stored user attributes includes a role attribute based on a role hierarchy.

7. The method of claim 6, wherein the at least one of the plurality of rules includes a rule specifying how to derive the access right value based on the role attribute.

8. A computer system for provisioning organization users new to a remote service provider, the computer system including one or more processors configured to perform operations including:

receiving a request from a user enrolled with an identity provider to access a system of the remote service provider via a single sign-on protocol, wherein the request requires creation of an organization user account for access to the system of the remote service provider;

receiving, as part of the request, stored user attributes including a role attribute associated with an existing account of the user from the identity provider via the single sign-on protocol;

receiving data specifying a plurality of rules to apply when setting up the user as a new user to access the system of the remote service provider;

storing the plurality of rules with a system user profile of a system user with account creation rights;

upon receipt of the request from the user, retrieving at least one rule of the plurality of rules from the system user profile;

deriving a permission, as specified by the at least one rule, for accessing an object within the system based on the stored user attributes, by:

matching the role attribute associated with the existing account to the at least one rule;

determining the permission for accessing the object within the system based on applying the at least one rule to the role attribute, and the matching; and creating, at the remote service provider, the organization user account with the permission for accessing the object based on the request.

9. The computer system of claim 8, wherein the single sign-on protocol includes SAML (Security Assertion Markup Language), OAuth (Open standard for Authorization), or OpenID.

10. The computer system of claim 8, wherein the role attribute is a first role attribute, and the wherein the one or more processors are configured to further perform operations including requesting, from a client device, a second role attribute not included in the request.

11. The computer system of claim 8, wherein the creating further includes:

creating a management account object at least based on an account identifier attribute;

creating a contact object at least based on a contact identifier attribute and the management account object; and creating a new portal user account at least based on the management account object and the contact object.

12. A computer system for initializing rules for provisioning organization users, enrolled with an identity provider, new to a remote service provider, the computer system including one or more processors configured to perform operations including:

receiving a request via a single sign-on protocol to access a system of the remote service provider, wherein the request requires creation of an organization user account for access to the system;

receiving, at a provisioning framework device via a network, data specifying a plurality of rules to apply when setting up the user as a new user to access the system of the remote service provider, as well as stored user attributes associated with an existing account of the user from the identity provider;

storing the plurality of rules with a system user profile of a system user with account creation rights;

matching, by the provisioning framework device, at least one of the stored user attributes to at least one of the plurality of rules;

determining, at the provisioning framework device, an access right value associated with an object of the system based on applying the at least one of the plurality of rules to the at least one of the stored user attributes, and the matching; and updating, at the remote service provider, an organization user account to possess the access right value.

13. The computer system of claim 12, wherein the at least one of the stored user attributes includes a role attribute based on a role hierarchy.

14. The computer system of claim 13, wherein the at least one of the plurality of rules includes a rule specifying how to derive the access right value based on the role attribute.

15. A computer readable storage medium has instructions stored for provisioning organization users new to an organization thereon which, when executed by one or more computers, cause the one or more computers to perform operations including:

receiving a request from a user enrolled with an identity provider to access a system of a remote service provider via a single sign-on protocol, wherein the request requires creation of an organization user account for access to the system of a remote service provider;

receiving, as part of the request, stored user attributes including a role attribute associated with an existing account of the user from the identity provider, via the single sign-on protocol;

receiving data specifying a plurality of rules to apply when setting up the user as a new user to access the system of the remote service provider;

storing the plurality of rules with a system user profile of a system user with account creation rights;

upon receipt of the request from the user, retrieving at least one rule of the plurality of rules from the system user profile;

deriving a permission, as specified by the at least one rule, for accessing an object within the system based on the stored user attributes, by:

matching the role attribute associated with the existing account to the at least one rule;

determining the permission for accessing the object within the system based on applying the at least one rule to the role attribute, and the matching; and creating the organization user account with the permission for accessing the object based on the request.

16. The computer readable storage medium of claim 15, wherein the single sign-on protocol includes SAML (Security Assertion Markup Language), OAuth (Open standard for Authorization), or OpenID.

17. The computer readable storage medium of claim 15, wherein the role attribute is a first role attribute, and the operations further including requesting, from a client device, a second role attribute not included in the request.

18. The computer readable storage medium of claim 15, wherein the creating further includes:

creating a management account object at least based on an account identifier attribute;

creating a contact object at least based on a contact identifier attribute and the management account object; and creating a new portal user account at least based on the management account object and the contact object.

19. A computer readable storage medium has instructions stored for initializing rules for provisioning organization users, enrolled with an identity provider, new to a remote service provider thereon which, when executed by one or more computers, cause the one or more computers to perform operations including:

receiving a request via a single sign-on protocol to access a system of the remote service provider, wherein the request requires creation of an organization user account for access to the system;

receiving, at a provisioning framework device via a network, data specifying a plurality of rules to apply when setting up the user as a new user to access the system of the remote service provider, as well as stored user attributes associated with an existing account of the user from the identity provider;

storing the plurality of rules with a system user profile of a system user with account creation rights;

matching, by the provisioning framework device, at least one of the stored user attributes to at least one of the plurality of rules;

determining, at the provisioning framework device, an access right value associated with an object of the system based on applying the at least one of the plurality of rules to the at least one of the stored user attributes, and the matching; and creating, at the remote service provider, the organization user account with the access right value based on the request.

20. The computer readable storage medium of claim 19, wherein the at least one of the stored user attributes includes a role attribute based on a role hierarchy.

21. The computer readable storage medium of claim 20, wherein the at least one of the plurality of rules includes a rule specifying how to derive the access right value based on the role attribute.

* * * * *